United States Patent Office 3,507,922
Patented Apr. 21, 1970

3,507,922
PRODUCTION OF UNSATURATED ALDEHYDES
AND KETONES
Brian Crosbie Fielding, Northwich, England, assignor to Imperial Chemical Industries Limited, London, England, a corporation of Great Britain
No Drawing. Filed Feb. 8, 1965, Ser. No. 431,189
Claims priority, application Great Britain, Feb. 21, 1964, 7,391/64
Int. Cl. C07c 45/04
U.S. Cl. 260—604                                     7 Claims

ABSTRACT OF THE DISCLOSURE 1-olefins are oxidized to unsaturated aldehydes or ketones, for example propylene to acrolein, by means of mercuric salts in two successive reactions, of which in the first an olefin/mercuric salt addition compound is formed and in the second the compound is decomposed by heating at about 90° C. or above in contact with an acid aqueous phase. A water-immiscible organic solvent for the aldehyde or ketone is present along with the reactants during the second or both reactions, for the purpose of removing the aldehyde or ketone from contact with the aqueous phase as it is formed in order to prevent their decomposition in side-reactions.

This invention relates to a process for making unsaturated aldehydes and ketones from olefines, particularly to an improvement in the process by which olefines containing three or more carbon atoms are oxidised by means of mercuric salts to give the corresponding aldehydes or ketones.

It is known that olefines containing three or more carbon atoms can form addition compounds with aqueous solutions or suspensions of certain mercuric salts, and that on heating these compounds, preferably in an acidic aqueous environment, the olefines are oxidised to aldehydes or ketones. If the olefine contains a terminal $>CH_2$ group the aldehyde or ketone is unsaturated; for example, propylene is oxidised to acrolein, isobutene to methacrolein and 1-butene to methyl vinyl ketone. If the olefinic double bond is not attached to a terminal carbon atom the oxidation process yields a saturated ketone; for example 2-butene gives methyl ethyl ketone.

The yields of aldehydes or ketones obtainable by this oxidation process depend on several variables notably on the particular mercuric salt, on the acidity of the aqueous reaction medium, on whether the reaction is carried out in one or more stages, and on the temperature but in practice they are not near the theoretical value and are often low. One reason for low yields may be that the aldehyde or ketone itself forms an addition compound with mercuric ions, from which it is not subsequently liberated, or takes part in other undesirable side reactions. Acrolein for example can undergo polymerisation and hydration in the presence of aqueous acids, and complex formation and further oxidation in the presence of mercuric salts. In the presence of mercuric salts mercurous can disproportionate to give mercury and mercuric salts which then react further with acrolein. Another possible reason for low yields is that in a wholly aqueous system contact between an insoluble organic gas or liquid and the dissolved or suspended mercuric salt is not good enough to allow the local concentration of olefine to be sufficiently high. Thus if high yields of product are to be secured and the precipitation of mercury avoided the product should be removed as quickly as possible from the aqueous phase, and this can be achieved by having a suitable inert water-immiscible solvent present in the reaction stages where unsaturated aldehyde or ketone is formed. Such a solvent also allows the use of concentrations of olefine greater than the theoretical represented by the equation (for propylene)

$$C_3H_6 + H_2O + 4Hg^{++} \longrightarrow 2Hg_2^{++} + 4H^+ + CH_2=CH-CHO$$

whereas in known one-liquid-phase aqueous systems an excess of propylene always results in the precipitation of mercury and its loss, as far as further chemical reaction is concerned, to the system.

We have in fact now found that by carrying out the reactions wholly or partly in a system containing two immiscible liquid phases, in one of which the olefine and the aldehyde or ketone are soluble, good yields of aldehyde or ketone are obtained and undesirable side reactions avoided.

The meaning behind the term wholly or partly is respectively that either the reaction as a whole, that is to say the first stage involving formation of the olefine/mercuric salt addition compound and the second stage involving subsequent decomposition of the addition compound to give aldehyde or ketone, is carried out in the two-liquid-phase system, or that only the second stage is carried out in such a system. In the latter case the first stage can be carried out either in a wholly aqueous system or wholly in the non-aqueous system provided by the other liquid. In all three variations the second stage, in which the addition compound is decomposed, always takes place in the two-liquid-phase system.

Thus according to the general form of our invention a process for oxidising a 1-olefine to an unsaturated aldehyde or unsaturated ketone by means of at least one mercuric salt comprising two successive reactions in the first of which an olefine/mercuric salt addition compound is formed, and in the second of which said addition compound is decomposed in contact with an acidic aqueous phase to liberate unsaturated aldehyde or unsaturated ketone, is characterised in that present along with the reactants during at least said second reaction is a water-immiscible organic liquid as hereinafter defined.

The water-immiscible organic liquid is defined as being chemically inert towards all components of the reaction systems and to all products thereof, as being a solvent for 1-olefines and for the unsaturated aldehydes and ketones produced therefrom by the process of the invention, and as being such that the azeotrope it forms with the aqueous phase in the second of the two successive reactions has a boiling point at atmospheric pressure high enough to allow the use of a sufficiently high temperature in that reaction. Since this second reaction is generally carried out above 90° C., commonly 90° C. to 100° C., though it can be higher, this means that the azeotrope preferably boils at 90° C. or higher. Liquids that meet these requirements are found among the paraffins, chlorinated paraffins, chlorinated olefines and aliphatic ethers, for example normal octane, chloroform, tetrachloroethane, perchloroethylene, di-n-butyl ether. Liquids whose azeotropes with the aqueous phase would boil at temperatures below 90° C., for example petroleum ether and diethyl ether, and which would otherwise meet the requirements could possibly be used if the second reaction were carried out under elevated pressure.

According to the first particular form of our invention a process for making an unsaturated aldehyde or ketone comprising in a first reaction contacting a 1-olefine containing at least three carbon atoms in the molecule with a mercuric salt dissolved or suspended in an aqueous solution of an acid to give an olefine/mercuric salt addition compound, and in a second and successive reaction decomposing said olefine/mercuric salt addition compound by heating in said aqueous acid solution to give as product an unsaturated aldehyde or ketone is characterised in that also present in the reaction system during both of said reactions is a water-immiscible organic liquid as hereinbefore defined.

According to the second particular form of our invention a process for making an unsaturated aldehyde or ketone comprises in a first reaction contacting a 1-olefine containing at least three carbon atoms, in the molecule with a mercuric salt in a water-immiscible organic liquid as hereinbefore defined to give a system comprising an olefine/mercuric salt addition compound and said organic liquid, and thereafter in a second reaction adding to said system an aqueous solution of an acid, heating the two-liquid-phase mixture so obtained to decompose said olefine/mercuric salt addition compound therein and give as product an unsaturated aldehyde or ketone, and subsequently separating said product from the organic liquid phase.

According to the third particlar form of our invention a process for making an unsaturated aldehyde or ketone comprises in a first reaction contacting a 1-olefine containing at least three carbon atoms in the molecule with a mercuric salt in an aqueous solution of an acid to give an acidic aqueous system comprising an olefine/mercuric salt addition compound contained in an acidic aqueous medium, and thereafter in a second reaction adding to said acidic aqueous system a water-immiscible organic liquid as hereinbefore defined, heating the two-liquid-phase mixture so obtained to decompose said olefine/mercuric salt addition compound therein and give as product an unsaturated aldehyde or ketone and subsequently recovering said product from the organic liquid phase.

Examples of mecuric salts that may be used in the reactions are the sulphate, benzene sulphonate, p-toluene sulphonate, methane sulphonate, acetate, trichloroacetate, monochlorodifluoroacetate, trifluoroacetate, perchlorate, oxalate, succinate, fluoborate. Some of these give better yields of aldehyde or ketone than others but the benzene sulphonate, p-toluene sulphonate, monochlorodifluoroacetate and trifluoroacetate are particularly suitable; for example, from propylene as starting olefine, they can give yields of acrolein of the order of 80–90% based on the weight of mercuric ion.

Examples of 1-olefines that can be oxidised by the process are propylene, 1-butene, isobutene, 1-pentene and methyl 1-butenes.

One way of carrying out the process of the first form of the invention is to pass the olefine into a reaction system comprising the organic solvent and an aqueous acidic solution of the mercuric salt, at a temperature below 50° C., generally below 30° C. until the addition compound has been formed. The acidity is conveniently provided by the acid corresponding to the mecuric salt, but it is not essential that the acid should be this one since other acids that give rise to soluble mercuric salts may be used, or a mixture of such acids. Likewise more than one mercuric salt may be used. When the formation of the addition compound is complete more acid or, if desired, more acid and mercuric salt is added to the system and the temperature raised to about 90° C. or more, whereby the addition compound is decomposed with liberation of aldehyde or ketone, which may be stripped from the system by means of a stream of inert gas, for example nitrogen.

It is also possible with some mercuric salts to carry out the reaction as a whole in the higher temperature range by what might be described as a variation of the first form of the invention. For example, propylene may be passed continuously into a mercuric trifluoroacetate/trifluoroacetic acid/water/tetrachloroethane system at 90°–100° C. and the tetrachloroethane phase separated and stripped of acrolein and recycled to the reaction system. Other ways of applying the techniques of two-liquid-phase reaction systems can be employed.

One way of carrying out the process of the second form of the invention is to react the olefine at room temperature with a suspension of the mercuric salt in the organic liquid until the addition compound has been formed and dissolved in the liquid. The solution is then acidified with an aqueous solution of an acid, preferably the one corresponding to that of the mercuric salt and the mixture, heated to 90°–100° C. or somewhat higher. The addition compound is decomposed and the aldehyde or ketone set free. The addition compounds formed with some mercuric salts are more soluble in the organic liquid than those formed with others. For example, the mercuric trifluoroacetate/propylene addition compound is readily soluble in chloroform and tetrachloroethane, whereas the mercuric perchlorate/propylene compound is practically insoluble in them.

In the table, Examples 2, 4, 8 and 10 illustrate the first form of the invention and relate to five experiments in all of which excess propylene was reacted at 25°–30° C. with 25 ml. of an aqueous acid solution of a mercuric salt in the presence of tetrachloroethane, after which a further 75 ml. of the aqueous acid solution of the mercuric salt was added to the system. The resulting mixture was then heated at 90° C. with the aqueous acid corresponding to the mercuric salt at a strength of 2 normal and volatile products were stripped out with a slow stream of nitrogen. Alternative methods for removing volatile products are countercurrent extraction of the reaction system with the organic solvent and direct distillation up a fractionating column and collection of the products in the form of azeotropes with water having minimum boiling points. Examples 1, 3, 5, 7 and 9 relate to five control experiments carried out in the same way as the other five but in the absence of tetrachloroethane. Example 11 illustrates the second form of the invention and relates to an experiment in which propylene was oxidised with mercuric trifluoroacetate.

TABLE

| Example | Mercuric Salt | Concentration of mercuric salt, g. HgO/100 mls. | $C_2H_2Cl_4$ (mls.) | Percent Yield based on Hg'' ion | |
|---|---|---|---|---|---|
| | | | | Acrolein | Acetone |
| 1 | Perchlorate | 22 | None | 32 | 8 |
| 2 | do | 22 | 200 | 34 | 10 |
| 3 | Chlorodifluoroacetate | 11 | None | 36 | 14 |
| 4 | do | 11 | 200 | 85 | <1.5 |
| 5 | Benzenesulphonate | 5.5 | None | 38 | 15 |
| 6 | do | 5.5 | 200 | 90 | <3 |
| 7 | Trifluoroacetate | 11 | None | 46 | 8 |
| 8 | do | 11 | 200 | 81 | 6 |
| 9 | p-Toluenesulphonate | 8 | None | 42 | Trace |
| 10 | do | 16 | 200 | 89 | 8 |

EXAMPLE 11

Propylene was passed in excess into a suspension of mercuric trifluoroacetate in tetrachloroethane at 20° C. until no more suspended material could be seen, indicating that all the mercuric salt had formed the olefine addition compound which is soluble in tetrachloroethane.

It was observed that heating the solution with anhydrous trifluoroacetic acid, even to 120° C. and with an excess of acid, caused no decomposition, but on addition of water to the hot solution the latter rapidly evolved acrolein. Aqueous acid thus seems to be essential for the decomposition stage. When the solution of the addition compound formed at 20° C. was heated to 100° C. with excess of 1.0 N trifluoroacetic acid or 1.0 N perchloric acid acrolein was formed in greater than 90% yield based on the weight of mercuric trifluoroacetate and the amount of acetone formed at the same time was less than 2%. It was noticed that in contrast with wholly aqueous systems the amount of metallic mercury formed as an undesirable by-product was small.

EXAMPLE 12

This example illustrates the third form of the invention and is in two parts (a) and (b) of which (a) is a blank experiment in the sense that the water-immiscible organic liquid was omitted, and (b) and (c) are experiments to show respectively the effects of perchloroethylene and n-octane in raising the yield compared with that obtained in (a). Yields are by weight and calculated on the weight of mercuric ions.

(a) Propylene was passed into 25 ml. of 0.5 N mercuric p-toluenesulphonate in 2 N p-toluenesulphonic acid at 20° C. until absorption was complete (25 minutes). The resulting solution containing the propylene/mercuric salt addition compound was added to 75 ml. of the mercuric p-toluenesulphonate/p-toluenesulphonic acid solution and the whole refluxed at 90° C. to decompose the addition compound whilst a stream of nitrogen was passed through at a rate of 2 litres per hour. The effluent gases were absorbed in ice-cold water containing 0.10% by weight of hydroquinone. Acrolein recovered corresponded to a 60% yield calculated on the weight of mercuric ions present, and 0.45 g. of metallic mercury was precipitated.

(b) A reaction identical to that described in (a) was carried out but with 100 ml. of perchloroethylene present in the decomposition (refluxing) stage at 90° C. An 85% yield of acrolein was obtained and no precipitation of mercury was observed.

(c) A reaction identical to that described in (a) was carried out but with 100 ml. of n-octane present in the refluxing stage at 91° C. An 82% yield of acrolein was obtained, again with no observable precipitation of mercury.

EXAMPLE 13

This example illustrates the first form of the invention using perchloroethylene as the water-immiscible organic liquid.

11.0 g. red mercuric oxide was dissolved in 21.7 ml. of 60% by weight perchloric acid solution and the whole filtered and made up to 50 ml. with distilled water to give 2 N mercuric perchlorate in 2 N perchloric acid.

12.5 ml. of this solution and 25 ml. of perchloroethylene were saturated with propylene at 20° C. to give the propylene/mercuric perchlorate addition compound, and the whole run into 150 ml. of boiling 2 N perchloric acid containing 50 ml. of perchloroethylene. Volatile products were stripped out in a stream of nitrogen and absorbed in ice-cold water containing 0.20% by weight of hydroquinone. After one hour the acrolein recovered corresponded to a yield of 82% by weight calculated on the weight of mercuric ions present, and no precipitation of mercury was observed.

EXAMPLE 14

This example illustrates the use of di-n-butyl ether as water-immiscible organic liquid in the first form of the invention.

25 ml. of 0.5 N mercuric p-toluenesulphonate in 2 N p-toluenesulphonic acid was reacted with propylene at 0°–20° C. for one hour in the presence of 50 ml. di-n-butyl ether. The resulting mixture was then added to 75 ml. of the mercuric p-toluenesulphonate/p-toluenesulphonic acid solution in the presence of 150 ml. of di-n-butyl ether and the whole refluxed at 94° C. with stirring. Nitrogen was passed through the system at a rate of 10 litres per hour to strip out acrolein and the latter was absorbed in ice-cold water containing 0.20% by weight of hydroquinone. Acrolein recovered corresponded to a yield of 94% by weight calculated on the weight of mercuric ions present.

EXAMPLE 15

This example illustrates the oxidation of 1-butene to methylvinylketone with perchloroethylene as the water-immiscible organic liquid according to the third form of the invention.

25 ml. of 0.5 N mercuric p-toluenesulphonate in 2 N p-toluenesulphonic acid was cooled to 0° C. and a slow stream of 1-butene passed in for one hour. The resulting solution was added to 75 ml. of the mercuric p-toluenesulphonate/p-toluenesulphonic acid solution together with 25 ml. of perchloroethylene and the whole refluxed at 91° C. whilst nitrogen at a rate of 2 litres per hour was passed through the system, and products absorbed in 0.20% by weight hydroquinone solution at 0°–5° C. A yield of 72% by weight of methylvinylketone was obtained and no mercury was observed.

EXAMPLE 16

This example is similar to Example 15 and illustrates the effect of a higher concentration of the addition compound in the decomposition stage.

50 ml. of the mercuric p-toluenesulphonate/p-toluenesulphonic acid solution was reacted with 1-butene and the resulting mixture decomposed with 50 ml. of the same solution together with 50 ml. of perchloroethylene under reflux at 91° C. Nitrogen was passed at a rate of 5 litres per hour and the products absorbed in 0.20% by weight hydroquinone solution as before. An 83% by weight yield of methylvinylketone was obtained and only a trace of mercury observed.

EXAMPLE 17

This example illustrates the oxidation of iso-butene to give methacrolein with perchloroethylene as the water-immiscible liquid according to the first form of the invention.

11.0 g. red mercuric oxide was dissolved in 22.5 ml. of trifluoroacetic acid and diluted to 100 ml. to give a N solution of mercuric trifluoroacetate in 2 N trifluoroacetic acid.

25 ml. of this solution and 50 ml. of perchloroethylene were cooled in ice and iso-butene passed through for 30 minutes until absorption was complete. The resulting solution was then mixed with the remaining 75 ml. acidic mercuric trifluoroacetate solution together with a further 150 ml. of perchloroethylene and the whole refluxed for 2 hours in a stream of nitrogen at the rate of 2 litres per hour. The volatile products were absorbed in 0.20% by weight aqueous hydroquinone as before. A 77% by weight yield of methacrolein was obtained.

EXAMPLE 18

This example and Example 19 illustrate in respect of 1-butene a variation of the first form of the invention as hereinbefore described in which both stages are carried out at the higher temperature.

100 ml. of 0.5 N mercuric p-toluene sulphonate in 2 N p-toluenesulphonic acid was refluxed with 100 ml. of perchloroethylene at 91° C. and 1-butene passed through for one hour at the rate of 2 litres per hour. Methyl vinyl ketone from the exit gases was collected in 0.20% by weight aqueous hydroquinone at 0° C. and amounted to 0.337 g. which is a yield of 77% of the theoretical calculated on the weight of mercuric ions.

EXAMPLE 19

The experiment described in Example 18 was repeated and gave a yield of methylvinylketone equivalent to 85% of the theoretical after one hour without observable precipitation of mercury. On continuing the reaction precipitation of mercury began to be noticed after about 1½ hours by which time the yield had risen to over 90%.

What I claim is:

1. In a process for oxidizing a 1-olefin selected from the group consisting of propylene, isobutene, 1-butene and 1-pentene to an unsaturated compound selected from unsaturated aldehydes and unsaturated ketones by reaction with a mercuric salt selected from the group consisting of the sulphate, benzene sulphonate, p-toluene sulphonate, methane sulphonate, acetate, trichloroacetate, monochlorodifluoroacetate, trifluoroacetate, perchlorate, oxalate, succinate, and fluoborate in two successive reactions, in the first of which an olefin/mercuric salt addition compound is formed, and in the second of which said addition compound is decomposed by heating to a temperature of about 90° C. or higher in contact with an acidic aqueous phase to liberate the unsaturated compound, the improvement which comprises providing along with the reactants during at least said second reaction a solvent selected from the group consisting of n-octane, chloroform, tetrachloroethane, perchloroethylene and di-n-butyl ether which is a solvent for said 1-olefins and the unsaturated aldehydes and ketones produced therefrom and said solvent forming with the aqueous phase an azeotrope having a normal boiling point of 90° C. or higher.

2. A process as claimed in claim 1 in which the water-immiscible organic liquid is selected from the group consisting of normal octane, tetrachloroethane, perchloroethylene and di-n-butyl ether.

3. A process as claimed in claim 2 in which the mercuric salt is selected from the group consisting of mercuric sulphate, benzenesulphonate, p-toluenesulphonate, monochlorodifluoroacetate, trifluoroacetate and perchlorate.

4. A process as claimed in claim 1 for oxidizing a 1-olefin to an unsaturated compound selected from unsaturated aldehydes and unsaturated ketones comprising in a first reaction contacting an olefin selected from the group consisting of propylene, 1-butene and isobutene with the said mercuric salt in an aqueous solution of an acid to give an olefin/mercuric salt addition compound, and in a second and successive reaction decomposing said olefin/mercuric salt addition compound by heating in said aqueous acid solution to give said unsaturated compound and wherein also present in the reaction system during both of said reactions is the said water-immiscible organic liquid.

5. A process as claimed in claim 1 for oxidizing a 1-olefin to an unsaturated compound selected from unsaturated aldehydes and unsaturated ketones comprising in a first reaction contacting an olefin selected from the group consisting of propylene, 1-butene and isobutene with the said mercuric salt in the said water-immiscible organic liquid to give a system comprising an olefin/mercuric salt addition compound and said organic liquid, and thereafter in a second reaction adding to said system an aqueous solution of an acid, heating, the two-liquid-phase mixture so obtained to decompose said olefin/mercuric salt addition compound therein to give said unsaturated compound as product and subsequently recovering said product from the organic liquid phase.

6. A process as claimed in claim 1 for oxidizing a 1-olefin to an unsaturated compound selected from unsaturated aldehydes and unsaturated ketones comprising in a first reaction contacting an olefin selected from the group consisting of propylene, 1-butene and isobutene with the said mercuric salt in an aqueous solution of an acid to give an acidic aqueous system comprising an olefin/mercuric salt addition compound contained in an acidic aqueous medium, and thereafter in a second reaction adding to said acidic aqueous system the said water-immiscible organic liquid, heating the two-liquid-phase mixture so obtained to decompose said olefin/mercuric salt addition compound therein to give said unsaturated compound as product and subsequently recovering said product from the organic liquid phase.

7. A process for making acrolein by subjecting propylene to the process of claim 1 and using therein perchloroethylene as the water-immiscible organic liquid, and mercuric p-toluenesulphonate as the mercuric salt.

References Cited

UNITED STATES PATENTS

| | | | |
|---|---|---|---|
| 3,020,293 | 2/1962 | Schonberg et al. | 260—604 XR |
| 2,623,073 | 12/1952 | Toland | 260—597 |
| 2,398,685 | 4/1946 | Yale et al. | 260—597 |
| 2,197,258 | 4/1940 | Macallum | 260—604 |

BERNARD HELFIN, Primary Examiner

R. H. LILES, Assistant Examiner

U.S. Cl. X.R.

260—431, 597